Figure 1:
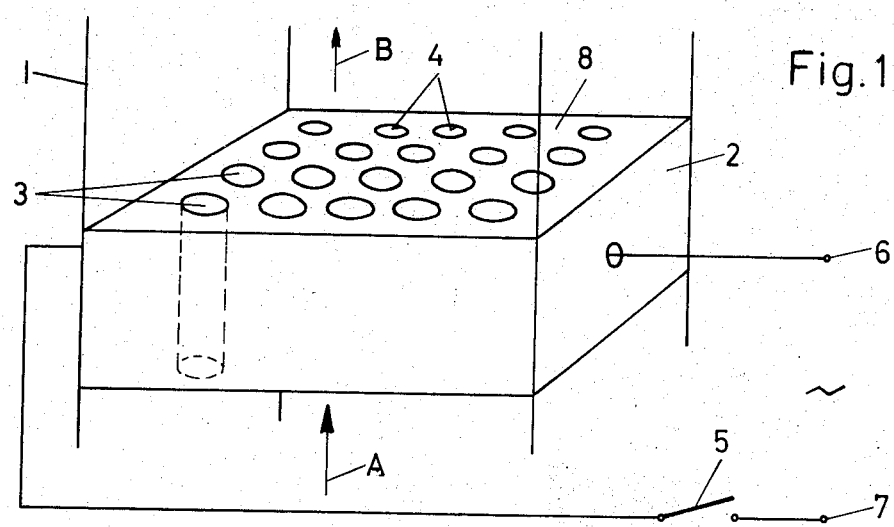

United States Patent
Dyre et al.

[15] 3,691,346
[45] Sept. 12, 1972

[54] ELECTRICALLY HEATED CATALYTIC AIR PURIFIER

[72] Inventors: Mogens Dyre, Nordborg; Jorgen Abildtrup, Augustenborg, both of Denmark

[73] Assignee: Danfoss A/S, Nordborg, Denmark

[22] Filed: July 13, 1970

[21] Appl. No.: 54,485

[30] Foreign Application Priority Data

July 3, 1969 Germany..........P 19 33 826.2

[52] U.S. Cl...........................219/374, 23/2 E, 23/4, 23/288, 219/307, 219/319, 219/375, 219/553, 252/516
[51] Int. Cl.............F24h 3/04, H01b 1/00, B01j 9/04
[58] Field of Search.....23/2 E, 4, 288; 219/207, 307, 219/319, 374–376, 381, 553; 252/516; 338/217

[56] References Cited

UNITED STATES PATENTS

| | | | |
|---|---|---|---|
| 1,334,809 | 3/1920 | Simon et al. | 219/381 UX |
| 3,032,635 | 5/1962 | Kraft | 219/381 UX |
| 3,477,827 | 11/1969 | Mott | 219/374 X |
| 3,244,860 | 4/1966 | Lindley | 219/376 X |
| 2,700,722 | 1/1955 | Gurley | 219/207 X |
| 2,941,962 | 6/1960 | Van der Beck | 252/516 |
| 3,507,627 | 4/1970 | Frant et al. | 219/307 X |
| 2,396,190 | 3/1946 | Morgan et al. | 23/4 |
| 2,850,366 | 9/1958 | Houdry | 23/288 |

FOREIGN PATENTS OR APPLICATIONS

| | | | |
|---|---|---|---|
| 124,097 | 4/1928 | Switzerland | 219/375 |

*Primary Examiner*—R. F. Staubly
*Attorney*—Wayne B. Easton

[57] ABSTRACT

The invention relates to air treatment equipment for the removal of impurities from the air such as odorous substances and bacterial spores. The equipment includes a support member made of silicon carbide, preferably beta silicon carbide, which gives it good thermal conductivity and allows it to operate as an electrical heating element. The support member has air passages through which air to be purified passes, the walls of the air passages being coated with a catalyst material such as platinum. In a preferred embodiment the support member also contains silicon oxynitride which imparts a better mechanical stability to the supporting element and allows the conductivity to be reduced.

1 Claim, 4 Drawing Figures

ELECTRICALLY HEATED CATALYTIC AIR PURIFIER

The invention relates to air-treatment equipment for the removal of impurities from the air, particularly substances having an odor and a taste, or bacterial spores, in which equipment the air is passed over a catalyst material which is applied to the surface of a supporting element and is heated with the help of an electrical heating device.

There are many impurities in the air which cannot be held back by a filter and which cause trouble because of their odor. It is therefore often desirable to eliminate such impurities from the air, whether in limited spaces, for example in a dining-room, a refrigerator or a baker's oven, or in a larger installation such as an air-conditioning plant.

It is known that materials having an odor or a taste and bacterial spores can be converted into other odorless organic or even inorganic compounds at higher temperatures, the lower limit of which is approximately 400° C, but the normal range of which is from 600° to 800° C. High temperatures of this kind however are undesirable in many cases since a high power-consumption is involved, the hot air generally has to be cooled again and the surrounding area has to be well insulated against the heating element.

It has in fact already been proposed to convert these impurities in the air at lower temperatures, i.e., 200° to 300° C, by the use of a catalyst such a platinum. In order fully to utilize the generally expensive catalyst material and to provide it with a large effective surface, it is applied to a ceramic supporting element made of aluminum oxide or porcelain for example. Such supporting elements however have poor thermal conductivity and are electrically insulating. It is therefore very difficult to raise the catalyst overall to a temperature above a minimum of for example 200° C, below which it becomes ineffective or is even "poisioned." Attempts have therefore been made to heat the catalyst indirectly either by the impure air itself, previously brought to a substantially higher temperature with the help of a heating element, or by means of a heating element the action of which passes through the supporting element. In both cases it has been necessary to raise the heating element to so high a temperature that similar disadvantages occur to those encountered in the direct removal of impurities from the air by means of a high-temperature incandescent element.

The object of the invention is to provide air-treatment equipment which can be operated using considerably lower temperatures than heretofore.

This object is achieved by means of air-treatment equipment of the initially described type and employing catalyst material, characterized in that the supporting element itself acts as the heating device as a result of the incorporation therein of electrically conducting silicon carbide.

Using silicon carbide it is possible to construct stable elements having a large surface area, the electrical conductivity of which is so rated that it can be kept at a temperature of 200° to 300° C without difficulty by applying an appropriate voltage. Generally, it may even be directly connected to a 110V or 220V mains. Here it is not necessary for the current to pass in a uniform manner through all parts of the element, since silicon carbide has a thermal conductivity that is five times as great as that of porcelain, so that each portion of the layer of catalyst material can be kept at the necessary temperature. As the result of combining the heating element and the supporting element, considerable simplification and saving in costs are effected when manufacturing the equipment. It is however particularly important that the highest temperature occuring in the system is the temperature of the supporting element.

In a preferred embodiment, the supporting element also contains silicon oxynitride. This material, well known as a bonding agent for silicon carbide elements, imparts a better mechanical stability to the supporting element and enables the conductivity to be reduced. Thus, by appropriate choice of the amount of the $Si_2ON_2$ constituent, the conductivity of the supporting element can be suited to the particular purpose.

Preferably, the silicon carbide is substantially beta-silicon carbide. This material has greater stability than alpha-silicon carbide. Broad-faced supporting elements with correspondingly greater surfaces can therefore be produced without the danger of fracture.

In a preferred embodiment, the supporting element contains a number of air-passages, and at least that surface of the supporting element formed by the walls of the passages carries the catalyst material. This results in a large catalyst surface inside the supporting element and this surface can be heated in a very uniform manner.

In this connection it is expedient for the heating current to be passed through the supporting element substantially at right-angles to the passages and for the portions of the outer surface of the element between the mouths of the passage to be free from catalyst material. The catalyst layers therefore extend substantially at right angles to the direction in which the current flows. Even when using an electrically conducting catalyst material such as platinum, the heating current is therefore not deflected or passed over a short-circuiting path.

If however it is required to provide an intermediate layer between the supporting element and the catalyst material, it is advisable to apply a layer of silicon dioxide between them. This material has an electrically insulating effect, but has good thermal conductivity.

A novel application of the air-treatment equipment of the invention results if the supporting element is arranged in the interior of a baker's oven and at the same time constitutes an oven-heating element. For example, the supporting element can constitute at least a substantial portion of the inside wall of the oven. Materials giving off an odor and occurring in the oven are immediately destroyed. It is even unnecessary to clean the baker's oven, since the greasy materials of the oven wall are burnt away and the odor-emitting substances that occur when this happens are destroyed at the same time. For this application too it is of advantage for the highest temperature to be equal to the temperature of the supporting element, since substantially higher temperatures are not permissible in a baker's oven.

In a similar manner, the supporting element can also be used as the heating element for a space-heating installation. It can be used in an air-conditioning installation for example and can both clean and heat the air that flows through the system.

Figure 2:
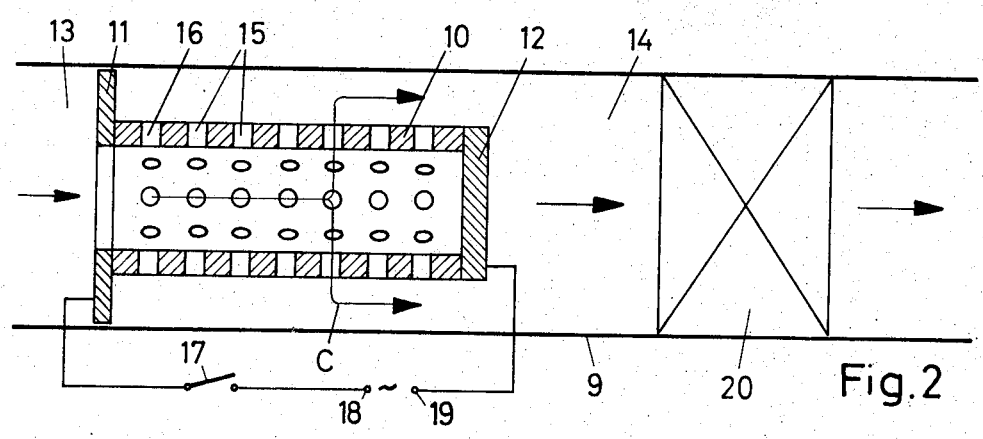
Figure 3:
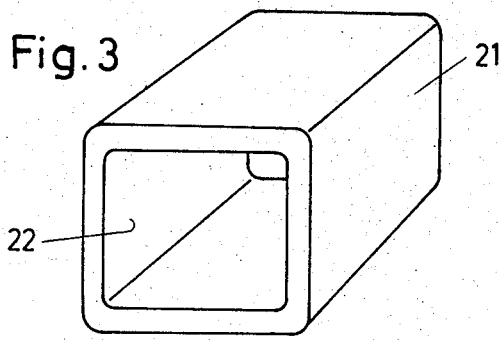
Figure 4:
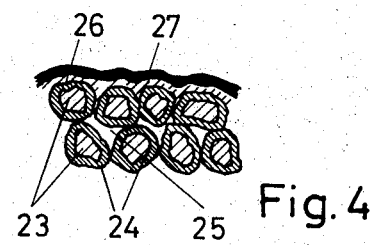

The invention will now be described in greater detail by reference to embodiments illustrated in the drawing, in which:

FIG. 1 shows a first embodiment of the air-treatment equipment of the invention, in a vertical duct, FIG. 2 shows a second embodiment in a horizontal pipe, FIG. 3 illustrates a unit for fitting in a baker's oven, and FIG. 4 is a schematic illustration of the surface structure of the supporting element.

FIG. 1 shows a vertical duct 1, the cross-section of which is filled by a block-like supporting element 2. This element contains numerous vertical passages 3, through which the air must flow, in the direction of the arrow A, before it can continue its flow in the direction of the arrow B. The inner walls 4 of the air-passages are directly coated with a thin layer of catalyst material, for example platinum. A heating current can be passed at right-angles to the passages 3 through the supporting element 2, for which purpose the supporting element is connected to terminals 6 and 7 by way of the switch 5.

The supporting element 2 consists of particles of silicon carbide which are bonded together by silicon nitride or silicon oxynitride. Since the end-faces 8 of the supporting element 2 are not covered by catalyst material, the heating current is passed over the entire cross-section of the supporting element 2 and heats this to the required temperature of approximately 250° C. At this temperature materials that emit an odor or have a taste, and bacterial spores, entrained by the air, are destroyed when they come into contact with the catalyst in the passages 3.

In the embodiment shown in FIG. 2, there is shown a horizontal airduct 9 of an air-conditioning installation, in which is incorporated a supporting element 10 of tubular form. The supporting element is fitted at the inlet side with an electrically conducting ring 11 and, at the outlet side, with an electrically conducting disc 12, the ring and the disc at the same time sealing the inlet side 13 and the outlet side 14 from each other. The supporting element again contains passages 15, the walls 16 of which are coated with catalyst material. The air thus flows through the supporting element 10 in the direction of the arrow C. The electrical connection with the terminals 18 and 19 is again by way of a switch 17. In this way the supporting element is again heated to the required temperature of about 250° C. A normal heating element 20, such as is known to be used in air-circulating heating installations, is fitted at the discharge side of the supporting element. This heating element provides additional heat and needs only to be switched on if the supporting element 10 does not suffice to heat the air.

FIG. 3 shows the supporting element 21 which can inserted as a unit in a baker's oven. In the case of this supporting element, the inner wall 22 is coated with the catalyst material. When this element 21 is connected to the mains, not only does the catalyst material become effective for cleansing the air, but at the same time the element heats the baker's oven. The supporting element 21 can of course also be made up of several parts.

FIG. 4 illustrates the structure of the inside wall of the supporting element 21. This element consists of numerous particles 23 of silicon carbide, preferably beta-silicon carbide, which are bonded together by means of an enveloping layer 24 of silicon oxynitride; the cavities 25 that remain cause no trouble. On the inside wall, this structure is covered by a layer 26 of silicon dioxide, over which is spread a thin layer 27 of the catalyst material. If the conductivity of the catalyst layer 27 creates no problem, as is the case in the embodiments of FIGS. 1 and 2, the $SiO_2$ coating 26 is not necessary.

We claim

1. An electrically heated catalytic air purifier comprising a heater body composed primarily of an electrically conducting silicon carbide, said body having a plurality of air passages extending therethrough, said passages being of greater length than width, an electrically conducting catalyst coating on only the walls of said passages, and means for directing an electric current through said heater body substantially at right angles to the direction of air flow through said passages.

* * * * *